US009518156B2

(12) United States Patent
Farrugia et al.

(10) Patent No.: US 9,518,156 B2
(45) Date of Patent: *Dec. 13, 2016

(54) METHODS OF PREPARING METAL NANODENDRIMER STRUCTURES

(71) Applicant: XEROX CORPORATION, Norwalk, CT (US)

(72) Inventors: Valerie M. Farrugia, Oakville (CA); Alana Desouza, London (CA); Sandra J. Gardner, Oakville (CA)

(73) Assignee: XEROX CORPORATION, Norwalk, CT (US)

( * ) Notice: Subject to any disclaimer, the term of this patent is extended or adjusted under 35 U.S.C. 154(b) by 69 days.

This patent is subject to a terminal disclaimer.

(21) Appl. No.: 14/604,560

(22) Filed: Jan. 23, 2015

(65) Prior Publication Data

US 2016/0215107 A1    Jul. 28, 2016

(51) Int. Cl.
*C08J 3/21* (2006.01)
*C08K 3/28* (2006.01)

(52) U.S. Cl.
CPC .......... *C08J 3/212* (2013.01); *C08K 3/28* (2013.01); *C08J 2367/02* (2013.01)

(58) Field of Classification Search
CPC ................................. C08J 3/212; C08K 3/28
See application file for complete search history.

(56) References Cited

U.S. PATENT DOCUMENTS

| | | | |
|---|---|---|---|
| 7,312,011 B2 | 12/2007 | Patel et al. | |
| 2012/0202148 A1* | 8/2012 | Veregin | G03G 9/093 430/108.1 |

FOREIGN PATENT DOCUMENTS

CN    101812181    *  8/2010    ............... C08J 3/03

OTHER PUBLICATIONS

Deng et al. Synthesis of PS/Ag Nanocompostie Spheres with Catalytic and Antibacterial Activities. ACS Appl. Mater. Interfaces 2012, 4, 5625-5632.*
English translation of CN 101812181. Aug. 25, 2010.*
Parry, Maria Nanogold and Nanosilver Hybrid Polymer Materials. Doctoral Thesis Victoria University of Wellington. 2013.*
Lopez-Tobar, Eduardo, Stability of the Disulfide Bond in Cystine Adsorbed on Silver and Gold Nanoparticles as Evidenced by SERS Data, J. Phys. Chem. C2013, 117, 1531-1537.
Sironmani, A. et al. (2011) Silver Nanoparticles-Universal Multifunctional Nanoparticles for Bio Sensing, Imaging for Diagnostic and Targeted Drug Delivery for Therapeutic Applications, Drug Delivery and Development—Present and Future, Dr. Izet Kapetanovic (Ed.), ISBN: 978-953-30-7615-7, In Tech, http://www.intechopen.com/books/drug-discovery-and-development-present-and-future/silver-nanoparticles-universal-multifunctional-nanoparticles-for-bio-sensing-imaging-for-diagnostics.

(Continued)

*Primary Examiner* — John Uselding
(74) *Attorney, Agent, or Firm* — Pillsbury Winthrop Shaw Pittman LLP (57) ABSTRACT

A method includes heating a sulfonated polyester resin in an organic-free solvent, adding a solution of silver (I) ion to the heated resin in water to form a mixture, reducing silver (I) to silver (0) by heating the mixture from about 65° C. to about 90° C., thereby forming an emulsion of composite particles comprising a sulfonated polyester matrix and a plurality of silver nanoparticles disposed within the sulfonated polyester matrix, and allowing the silver nanoparticles to agglomerate into a silver nanodendrite structure.

17 Claims, 10 Drawing Sheets

(56) References Cited

OTHER PUBLICATIONS

Kneipp, K. et al. Surface-enhanced Raman scattering and biophysics, J. Phys.: Condens. Matter 14 (2002) R597-R624.

Lee, K et al., In Vivo Imaging of Transport and Biocompatibility of Single Silver Nanoparticles in Early Development of Zebrafish Embryos (Sep. 2007) ACS Nano, vol. 1, No. 2, 133-143.

Korbekandi, H. et al., (2012) Silver Nanoparticles, The Delivery of Nanoparticles, Dr. Abbass A. Hashim (Ed.), ISBN: 978-953-51-0615-9, InTech, http://www.intechopen.com/books/the-delivery-of-nanoparticles/silver-nanoparticles.

Rashid, M. et al. Synthesis of Silver Nano Particles (Ag-NPs) and their uses for Quantitative Analysis of Vitamin C Tablets, Dhaka Univ. J. Pharm. Sci. 12(1): Jun. 29-33, 2013.

Rivera, P. et al., Synthesis and characterization of silver nanoparticles for biosensor design, Universidad Interamericana de Puerto Rico—Recinto de Ponce, Revista 360° C./No. 8/2013.

\* cited by examiner

FIG. 9B

METHODS OF PREPARING METAL NANODENDRIMER STRUCTURES

BACKGROUND

The present disclosure relates to methods of making nanostructured materials. In particular, embodiments herein related to methods of making metal nanostructured materials as exemplified by the preparation of silver nanodendrimer structures.

The design and fabrication of metal nanostructures that are tunable to adapt to numerous downstream applications related to sensors, solar cells, nanoelectric devices, biomedical and imaging processes is of increasing importance. Depending on the size and shape of nanostructured metal, electronic, photonic, optical, magnetic and catalytic properties can be fine-tuned for the appropriate application. Some common nanostructured morphologies include nanoparticles, nanorods and nanowires. More complicated nanostructures include multi-branched hierarchical-type nanostructures which are being employed increasingly in biosensor devices, photovoltaics and nanoelectronics. Other areas of interest include environmental chemistry and device fabrication and materials design. By applying a "bottom-up approach" used in nanomaterial chemistry, materials can be designed and systematized at the nanometer scale.

Figure 1:
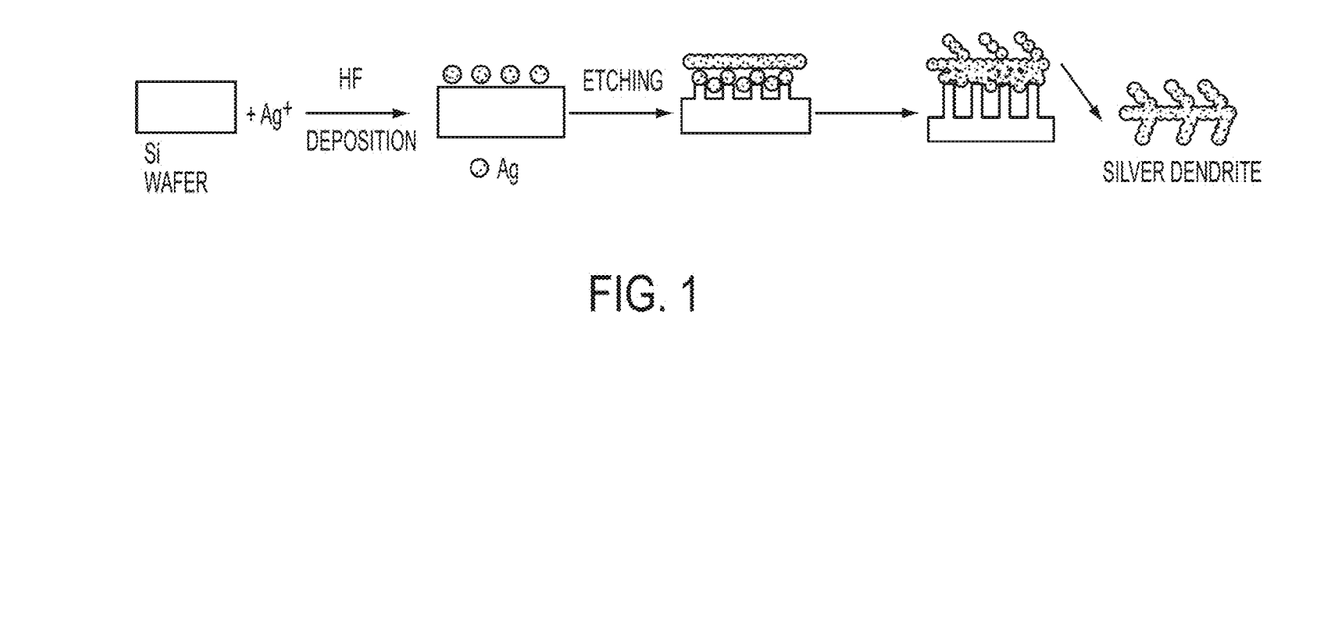
FIG. 1 shows a schematic illustration of the growth process of silver dendrites on a silicon wafer via an electroless metal deposition method.
Figure 2:
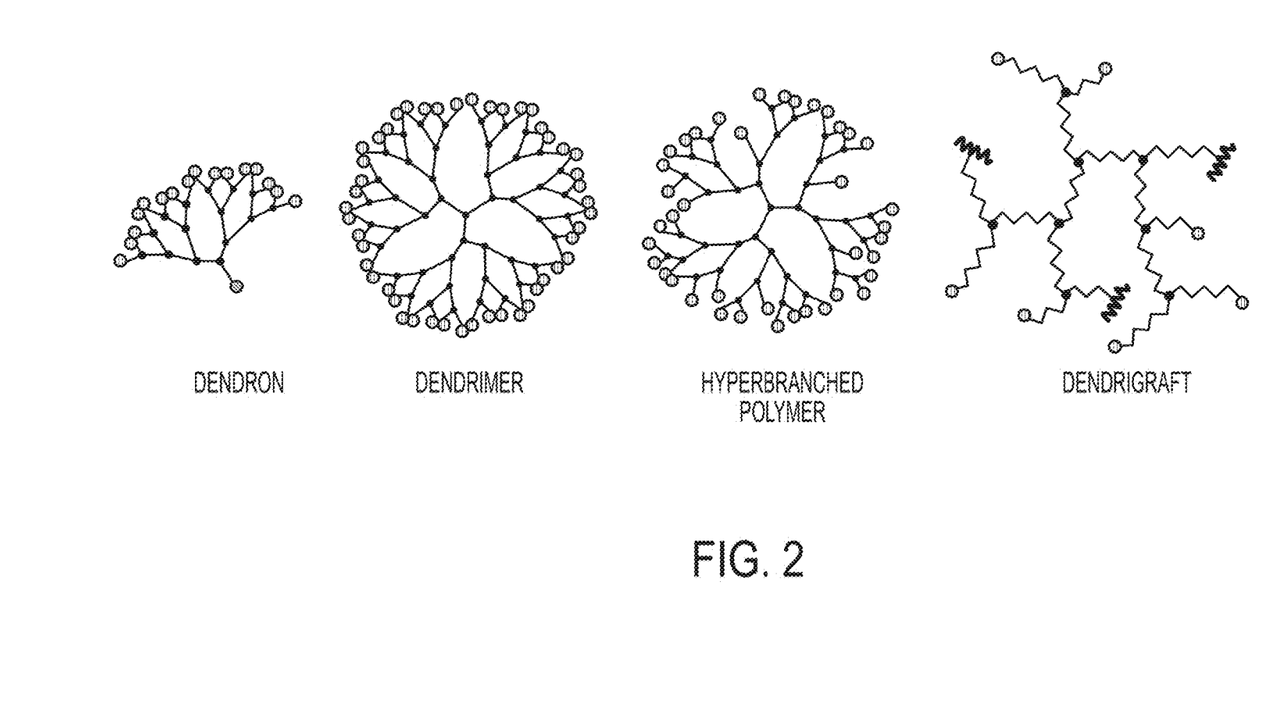
FIG. 2 shows illustrations of various subclasses of dendritic states.

The fabrication of these higher organized nanostructures, such as nanotrees and nanodendrites, generally requires high temperatures and rather harsh reaction conditions. FIG. 1 shows an exemplary process for the growth of silver dendrites on silicon wafer. One approach to forming metallic dendrites is by electrochemical deposition onto electrode surfaces. Other methods include hydrothermal synthesis, chemical vapor deposition, photolithography-assisted wafer scale fabrication, liquid phase reduction, solvothermal, ultraviolet irradiation photoreduction and other electrochemical methods. FIG. 2 shows numerous dendrite morphologies that may be accessed by the aforementioned methods.

However, there is a continuing need to develop methods to create these hierarchical structures via simple and cost-effective and environmentally sound ways for large scale applications. The methods described herein provide these and other advantages.

SUMMARY

In some aspects, embodiments herein relate to methods comprising heating a sulfonated polyester resin in an organic-free solvent, adding a solution of silver (I) ion to the heated resin in water to form a mixture, reducing silver (I) to silver (0) by heating the mixture from about 65° C. to about 90° C., thereby forming an emulsion of composite particles comprising a sulfonated polyester matrix and a plurality of silver nanoparticles disposed within the sulfonated polyester matrix, and allowing the silver nanoparticles to agglomerate into a silver nanodendrite structure.

In some aspects, embodiments herein relate to methods comprising heating a branched sulfonated polyester resin in de-ionized water, adding a solution of silver (I) ion to the heated resin in water to form a mixture, wherein silver (I) ion is present in a non-zero amount less than about 1 percent by weight of the mixture, reducing silver (I) to silver (0) by heating the mixture from about 65° C. to about 90° C., thereby forming an emulsion of composite particles comprising a sulfonated polyester matrix and a plurality of silver nanoparticles disposed within the sulfonated polyester matrix, and allowing the silver nanoparticles to agglomerate into a silver nanodendrite structure by leaving the emulsion to sit at ambient temperature for at least one week.

In some aspects, embodiments herein relate to silver nanodendrites formed in the presence of a branched sulfonated polyester resin.

BRIEF DESCRIPTION OF DRAWINGS

Various embodiments of the present disclosure will be described herein below with reference to the figures wherein:

FIG. 9 shows Example 4 initial SEM (9A) taken right after reduction of silver within BSPE matrix and the same slide that was left sitting for nearly 3.5 months (9B).

DETAILED DESCRIPTION

Methods for preparing silver dendrites include using a "template" in which the nanosilver materials are encapsulated into the channels or pores of a host. Other approaches for preparing silver dendrites utilize biomimetic-type self-assembly, i.e., the imitation of processes that occur in nature. These approaches are more environmentally friendly and are becoming more common. An example of a biomimetic method is the growth of morphology-controlled nanocrystals in which biomolecules have the capability to undergo molecular recognition. Increasinly advanced nanodevices are being fabricated with intricate dendritic nanosilver which contains structures such as trunks, leaflets and hierarchical branches.

Silver dendritic structures have been synthesized via irradiation reduction, electrochemical deposition, ultrasonic assisted solution reduction, pulse sonoelectrochemical techniques, and displacement reactions. However, most of these methods require harsh conditions such as heat, reducing agents and/or surfactants. Most wet chemical techniques use organic solvents such as N,N dimethylformamide and toxic reducing agents, for example, sodium borohydride.

Silver nanodendrites accessed by the methods herein have luminescent properties which can be used in imaging, biosensors and other biomedical applications. They also have a larger surface area than silver nanoparticles which results in better catalytic activity. Silver nanochains can be fabricated to enhance antibacterial properties by cutting off essential functions such as respiration and permeability of the bacterial cell while releasing silver nanoparticles from the dendrite structure to penetrate inside the bacteria damaging DNA and vital enzymes. Silver nanodendrites here may also have enhanced plasmonic features which may be applied in surface-enhanced Raman scattering (SERS).

The dendrites may have many uses whereby its presence confers a host polymer with unique properties. Some specialized applications may include targeted drug-delivery, macromolecular carriers, enzyme-like catalysis, the development of vaccines, antivirals, antibacterials and anticancer therapeutics, sensors, light harvesting, surface engineering and biomimetic applications.

Embodiments herein provide methods that employ sulfonated polyester (SPE), especially branched SPEs (BSPE) in the preparation of dendritic silver nanoparticles via green, non-toxic and environmentally safe methodology. The methods do not require any additional reagents such as reductants, surfactants, organic solvents, such as N,N dimethylformamide, or toxic reducing agents, such as sodium borohydride, which can result in significant environmental issues. Narayanan K. B. et al. Adv. Colloid Interface Sci. 169:59-79 (2011). The methods herein provide a well-defined dendritic silver nanostructure in $AgNO_3$ (aqueous) at room temperature that is readily scalable to large-scale quantities, such as about 10 grams or more, up to about kilogram scale.

Without being bound by theory, it is postulated that silver nanodendrite formation in the presence of sulfonated polyester resins occurs via a diffusion-limited aggregation (DLA) model. Barnaby, S. N. et al. Nanotechnology, 22:225605 (2011). According to the DLA model, the driving force of DLA facilitates the gradual aggregation of small silver particles into dendritic silver nanostructures. The growing structure starts as a cluster formation of the silver nanoparticles sticking together and forming a random path to the silver nuclei. The silver nuclei grows in the presence of the sulfonated polyester resin which helps to provide control over the nucleation and directional aggregation, as well as possibly acting as the reducing agent to provide nanosilver formation from silver (I) ion in solution. A non-equilibrium system may be formed which results in the formation of silver dendrites.

Scanning electron microscopy (SEM) and transmission electron microscopy (TEM) images in the Examples below illustrate the silver nanodendritic structures formed from silver nanoparticles in the presence of an exemplary BSPE. The BSPE silver nanodendrites have a large surface area making them suitable for use in biosensors, chemical sensors, plasmonics and superhydrophobic films. Zhao N. et al. Langmuir 21:4713 (2005). For comparison purposes, commercial Pt/C catalyst has a specific electrochemically active surface area (ECSA) of 74.0 $m^2$ $g_{Pt}^{-1}$ while CNTs are 47 $m^2$ $g^{-1}$. Typical nanodendrites have surface areas ranging from about 20 to about 60 $m^2$ $g_{Ag}^{-1}$.

It has been indicated that Ag nanodendrites exhibit stronger photoluminescence (PL) intensity than Ag particles since the hierarchically dendritic nanostructure have larger surface area-to-volume ratio due to large number of edges and corner atoms compared to Ag particles. The branched nature of the sulfonated polyester (when BSPE is used) provides larger surface area-to-volume, compared to the conventional Ag nanodendrites, due to the complex structure of the polymer-Ag interaction—possibly more edges and corner atoms.

The properties of these silver nanocomposite materials can be useful in applications such as catalysis, sensors, surface-enhanced materials, optical and electronic systems. The luminescence properties of silver nanodendrites also allows them to be incorporated as functional elements for photonics applications as well as for imaging, sensors or SERS applications.

The control of their morphology via the methods disclosed herein allows silver dendrites to be used in nanoscale devices and systems. The ratio of the concentration of silver ion to polymer concentration strongly affects the shape of particles from spherical to dendrite-like shape. When the ratio of sulfonated polyester relative to silver ion is about 1:1 but overall both components are at a relatively low in concentration (such as less than about 0.5 w/w % of each component) highly structured fibrous silver nanodendrites are formed. When the ratio of sulfonated polyester is about 100 times more or about 100:1 the nanodendrite structures have less intricacy. Increasing sulfonated polyester higher than about 100 times or greater than about 100:1, the structures start to show the formation of separate nanocrystals after a long period of time (e.g., about three months). It has also been determined that the porosity of the nanodendrites can be tuned by modifying the concentration of the metal ion source, e.g., silver nitrate.

A low silver ion precursor concentration relative to the sulfonated polyester was associated with the production of 'compact' morphologies or even nanospheres in some cases, while a high precursor concentration relative to sulfonated polyester (1:1 ratio but overall low concentration) yielded more porous and fibrous structures. It has been indicated that higher silver ion concentrations are associated with a faster nucleation, resulting in a higher population of nuclei, which would aggregate into a more open or loosely fibrous structure. A lower silver ion concentration, especially when the sulfonated polyester concentration is high, can lead to a 'limited' number of nuclei, which can grow into more compact structures with relatively larger sizes. A higher proportion of sulfonated polyester in the system tends to hinder or slow down the gradual aggregation of small silver particles that are to eventually form Ag dendrites.

Without being bound by theory, it is postulated that sulfonated polyesters act as a stabilizer and facilitate the reduction of metal ions. In an exemplary embodiment, a low precursor concentration of silver nitrate to a branched sulfonated polyester (BSPE, 100 times more BSPE relative to silver nitrate (100:1)) was associated with production of 'compact' morphologies, while a high precursor concentration (1:1 of BSPE relative to silver nitrate but at overall low concentrations (w/w %) of about 1 w/w % or less overall in aqueous solution) yielded more porous structures due to faster nucleation and more nuclei present in system.

A diffusion-limited aggregation (DLA) model can be used to explain the evolution of silver nanodendrites where the small silver particles are gradually aggregated under the driving force of DLA to form the dendritic silver nanostructures. The clusters or nanodendrites are particles that stick together with random paths to the silver nuclei which result in a growing structure. In the process of silver nuclei growth the sulfonated polyester matrix provides some control over the nucleation and directional aggregation, as well as playing a dual role as a reductant, which gives rise to a non-equilibrium system thereby favoring the formation of silver dendrites.

Due to their luminescent ordered nanostructure, silver dendrites may be integrated within microfluidic channels and applied in high-throughput biosensors. The ability to miniaturize any of the metal nanostructured materials and their composites is a substantial benefit. Other areas of interest include antibacterial applications, optical bi-stability, textiles photoresponsivity and the like. Without the need of additional reducing agents, these silver dendrite-polymer materials may exhibit no interference from other ions that may be disruptive in specific biosensor applications.

Again, without being bound by theory, the exemplary branched sulfonated polyester (BSPE) employed in the methods herein appear to act as a weak reducing agent, which is expected to favor the formation of dendritic nanostructures. Highly ordered dendritic silver nanostructures herein appear to undergo self-assembly in a biomimetic fashion with sulfonated polyester resins facilitating the process. Advantageously, the methods herein are uncomplicated and environmentally-sound and requires no heat after reduction of silver ion. It has been postulated that the sulfonate groups from the sulfonated polyester resins assists in the chelation of silver ions and also contributes a hydrogen or electron to assist in the reduction of silver (I) ions. The sulfonated polyseter may also play an important role in directing the formation of these hierarchical silver dendritic nanostructures.

Figure 3:
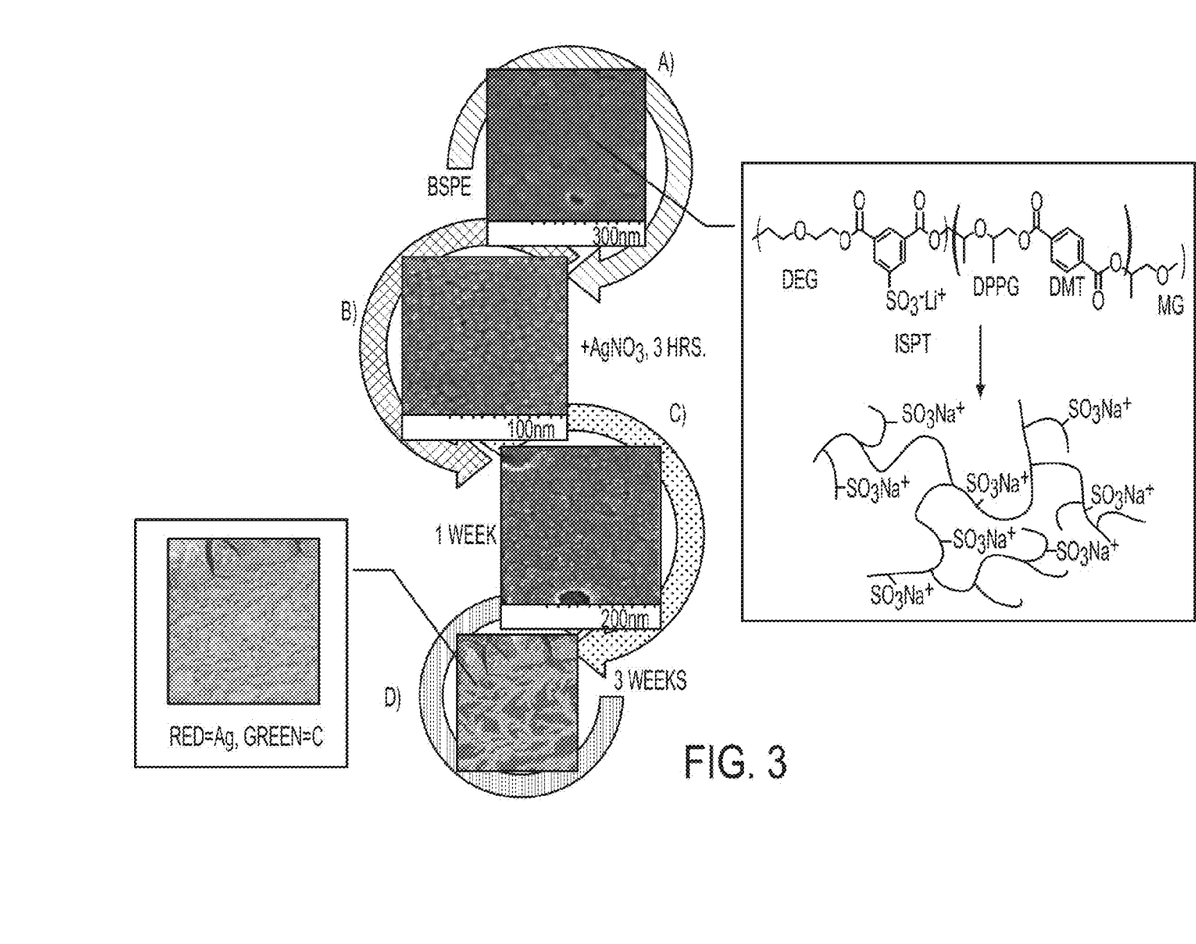
FIG. 3 shows the growth progression of silver nanodendrites in the presence of an exemplary branched sulfonated polyester (BSPE) over a period of three weeks, in accordance with embodiments herein: (a) chemical structure and scanning electron microscope (SEM) image of BSPE alone; (b) SEM image indicating growth of silver nanoparticles on BSPE assemblies after about three hours post silver nitrate addition; (c) SEM image indicating formation of discrete, large nanocrystals after one week; (d) SEM image indicating silver dendritic structures after three weeks of growth.

FIG. 3 shows a possible step-by-step process outlining the formation of silver dendrites in accordance with embodiments herein. The sulfonated polyester starts to slowly reduce silver (I) ions while maintaining the dispersion of the silver ions via coordination with the sulfonate groups. The silver ions continue to be slowly reduced by the sulfonated polyester leading to discrete and spherical silver nanoparticles throughout its matrix. Over 3 hours (step (b)) the sulfonated polyester continues to complex with the remaining silver (I) ions which are eventually reduced to form more silver nanoparticles. As the silver nanoparticles continue to grow they start to come together in the form of nanocrystals. Over the course of a week, the nucleation of the silver nanoparticles carries on and growth onto the preformed silver nanocrystals continues. The sulfonated polyester resin directs the growth of the silver dendrites by influencing (i.e., lower) the surface energies of the "system" as well as driving the orientation of discrete crystal lattices Eventually the boundaries between the nanocrystals close in on one another and trunk-like structures start to develop. Slowly more silver is reduced and becomes attached to the trunk-like assemblies which slowly look more dendrite-like and fractal in nature. The feathery branches and leaves are formed in about 3 weeks from the smaller silver aggregates that attach to the tips of growing dendrites.

In embodiments, there are provided methods comprising heating a sulfonated polyester resin in an organic-free solvent, adding a solution of silver (I) ion to the heated resin in water to form a mixture, reducing silver (I) to silver (0) by heating the mixture from about 65° C. to about 90° C., thereby forming an emulsion of composite particles comprising a sulfonated polyester matrix and a plurality of silver nanoparticles disposed within the sulfonated polyester matrix, and allowing the silver nanoparticles to agglomerate into a silver nanodendrite structure. In embodiments, heating the sulfonated polyester resin is conducted at a temperature from about 65° C. to about 90° C. In embodiments, the organic-free solvent is de-ionized water.

In embodiments, allowing the silver nanoparticles to agglomerate comprises leaving the emulsion to sit unstirred at ambient temperature for at least about one week.

In embodiments, a source of silver (I) ion is selected from silver nitrate, silver sulfonate, silver fluoride, silver perchlorate, silver lactate, silver tetrafluoroborate, silver oxide and silver acetate. In embodiments, a concentration of silver ion after addition is a non-zero amount about 1 percent by weight of the solution or less.

In embodiments, reducing silver (I) to silver (0) further comprises adding ascorbic acid or trisodium citrate as a reducing agent.

In embodiments, the sulfonated polyester resin is a branched polymer. In embodiments, the sulfonated polyester resin is a linear polymer. In embodiments, the sulfonated polyester matrix is a lithium, potassium, or sodium salt of a polymer selected from the group consisting of poly(1,2-propylene-5-sulfoisophthalate), poly(neopentylene-5-sulfoisophthalate), poly(diethylene-5-sulfoisophthalate), copoly-(1,2-propylene-5-sulfoisophthalate)-copoly-(1,2-propylene-terphthalate), copoly-(1,2-propylenediethylene-5-sulfoisophthalate)-copoly-(1,2-propylene-diethylene-terephthalatephthalate), copoly(ethylene-neopentylene-5-sulfoisophthalate)-copoly-(ethylene-neopentylene-terephthalatephthalate), and copoly(propoxylated bisphenol A)-copoly-(propoxylated bisphenol A-5-sulfoisophthalate).

In embodiments, the sulfonated polyester resin comprises a polyol monomer unit selected from the group consisting of trimethylolpropane, 1,2-propanediol, diethylene glycol, and combinations thereof.

In embodiments, the sulfonated polyester resin comprises a diacid monomer unit selected from the group consisting of terephthalic acid, sulfonated isophthalic acid, and combinations thereof.

In general, the sulfonated polyesters may have the following general structure, or random copolymers thereof in which the n and p segments are separated.

wherein R is an alkylene of, for example, from 2 to about 25 carbon atoms such as ethylene, propylene, butylene, oxyalkylene diethyleneoxide, and the like; R' is an arylene of, for example, from about 6 to about 36 carbon atoms, such as a benzylene, bisphenylene, bis(alkyloxy) bisphenolene, and the like; and p and n represent the number of randomly repeating segments, such as for example from about 10 to about 100,000.

Examples further include those disclosed in U.S. Pat. No. 7,312,011 which is incorporated herein by reference in its entirety. Specific examples of amorphous alkali sulfonated polyester based resins include, but are not limited to, copoly (ethylene-terephthalate)-copoly-(ethylene-5-sulfo-isophthalate), copoly(propylene-terephthalate)-copoly(propylene-5- sulfo-isophthalate), copoly(diethylene-terephthalate)-copoly(diethylene-5-sulfo-isophthalate), copoly(propylene-diethylene-terephthalate)-copoly(propylene-diethylene-5-sulfo-isophthalate), copoly(propylene-butylene-terephthalate)-copoly(propylene-butylene-5-sulfo-isophthalate), copoly(propoxylated bisphenol-A-fumarate)-copoly(propoxylated bisphenol A-5-sulfo-isophthalate), copoly(ethoxylated bisphenol-A-fumarate)-copoly(ethoxylated bisphenol-A-5-sulfo-isophthalate), and copoly(ethoxylated bisphenol-A-maleate)-copoly(ethoxylated bisphenol-A-5-sulfo-isophthalate), and wherein the alkali metal is, for example, a sodium, lithium or potassium ion. Examples of crystalline alkali sulfonated polyester based resins alkali copoly(5-sulfoisophthaloyl)-co-poly(ethylene-adipate), alkali copoly(5-sulfoisophthaloyl)-copoly(propylene-adipate), alkali copoly(5-sulfoisophthaloyl)-copoly(butylene-adipate), alkali copoly(5-sulfo-isophthaloyl)-copoly(pentylene-adipate), and alkali copoly(5-sulfo-iosphthalbyl)-copoly(octylene-adipate), alkali copoly(5-sulfo-isophthaloyl)-copoly(ethylene-adipate), alkali copoly(5-sulfo-isophthaloyl)-copoly (propylene-adipate), alkali copoly(5-sulfo-isophthaloyl)-co-poly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfoisophthaloyl)-copoly (ethylene-succinate), alkali copoly(5-sulfoisophthaloyl-copoly(butylene-succinate), alkali copoly(5-sulfoisophthaloyl)-copoly(hexylene-succinate), alkali copoly(5-sulfoisophthaloyl)-copoly(octylene-succinate), alkali copoly(5-sulfo-isophthaloyl)-copoly(ethylene-sebacate), alkali copoly(5-sulfo-isophthaloyl)-copoly(propylene-sebacate), alkali copoly(5-sulfo-isophthaloyl)-copoly(butylene-sebacate), alkali copoly(5-sulfo-isophthaloyl)-copoly(pentylene-sebacate), alkali copoly(5-sulfo-isophthaloyl)-copoly(hexylene-sebacate), alkali copoly(5-sulfo-isophthaloyl)-copoly(octylene-sebacate), alkali copoly(5-sulfo-isophthaloyl)-copoly(ethylene-adipate), alkali copoly(5-sulfo-isophthaloyl)-copoly(propylene-adipate), alkali copoly(5-sulfo-iosphthaloyl)-copoly(butylene-adipate), alkali copoly(5-sulfo-isophthaloyl)-copoly(pentylene-adipate), alkali copoly(5-sulfo-isophthaloyl)copoly(hexylene-adipate), poly(octylene-adipate), and wherein the alkali is a metal like sodium, lithium or potassium. In embodiments, the alkali metal is lithium. In embodiments, the alkali metal is sodium.

The linear amorphous polyester resins are generally prepared by the polycondensation of an organic diol and a diacid or diester, at least one of which is sulfonated or a sulfonated difunctional monomer being included in the reaction, and a polycondensation catalyst. For the branched amorphous sulfonated polyester resin, the same materials may be used, with the further inclusion of a branching agent such as a multivalent polyacid or polyol.

Examples of diacid or diesters selected for the preparation of amorphous polyesters include dicarboxylic acids or diesters selected from the group consisting of terephthalic acid, phthalic acid, isophthalic acid, fumaric acid, maleic acid, itaconic acid, succinic acid, succinic anhydride, dodecylsuccinic acid, dodecylsuccinic anhydride, glutaric acid, glutaric anhydride, adipic acid, pimelic acid, suberic acid, azelic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and mixtures thereof. The organic diacid or diester are selected, for example, from about 45 to about 52 mole percent of the resin. Examples of diols utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hyroxyethyl)-bisphenol A, bis(2-hyroxypropyl)-bisphenol A, 1,4-cyclohexanedimethanol, 1,3-cyclohexanedimethanol, xylenedimethanol, cyclohexanediol, diethylene glycol, bis (2-hydroxyethyl) oxide, dipropylene glycol, dibutylene, and mixtures thereof. The amount of organic diol selected can vary, and more specifically, is, for example, from about 45 to about 52 mole percent of the resin.

Alkali sulfonated difunctional monomer examples, wherein the alkali is lithium, sodium, or potassium, include dimethyl-5-sulfo-isophthalate, dialkyl-5-sulfo-isophthalate-4-sulfo-1,8-naphthalic anhydride, 4-sulfo-phthalic acid, 4-sulfophenyl-3,5-dicarbomethoxybenzene, 6-sulfo-2-naphthyl-3,5-dicarbomethoxybenzene, sulfo-terephthalic acid, dimethyl-sulfo-terephthalate, dialkyl-sulfo-terephthalate, sulfo-ethanediol, 2-sulfo-propanediol, 2-sulfo-butanediol, 3-sulfo-pentanediol, 2-sulfo-hexanediol, 3-sulfo-2-methyl-pentanediol, N,N-bis(2-hydroxyethyl)-2-aminoethane sulfonate, 2-sulfo-3,3-dimethylpent-anediol, sulfo-p-hydroxybenzoic acid, mixtures thereto, and the like. Effective difunctional monomer amounts of, for example, from about 0.1 to about 2 weight percent of the resin can be selected.

Branching agents for use in forming the branched amorphous sulfonated polyester include, for example, a multivalent polyacid such as 1,2,4-benzene-tricarboxylic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,3-dicarboxyl-2-methyl-2-methylene-carboxylpropane, tetra(methylene-carboxyl)methane, and 1,2,7,8-octanetetracarboxylic acid, acid anhydrides thereof, and lower alkyl esters thereof, 1 to about 6 carbon atoms; a multivalent polyol such as sorbitol, 1,2,3,6-hexanetetrol, 1,4-sorbitane, pentaerythritol, dipentaerythritol, tripentaerythritol, sucrose, 1,2,4-butanetriol, 1,2,5-pentatriol, glycerol, 2-methylpropanetriol, 2-methyl-1,2,4-butanetriol, trimethylolethane, trimethylolpropane, 1,3,5-trihydroxymethylbenzene, mixtures thereof, and the like. The branching agent amount selected is, for example, from about 0.1 to about 5 mole percent of the resin.

Polycondensation catalyst examples for amorphous polyesters include tetraalkyl titanates, dialkyltin oxide such as dibutyltin oxide, tetraalkyltin such as dibutyltin dilaurate, dialkyltin oxide hydroxide such as butyltin oxide hydroxide, aluminum alkoxides, alkyl zinc, dialkyl zinc, zinc oxide, stannous oxide, or mixtures thereof; and which catalysts are selected in amounts of, for example, from about 0.01 mole percent to about 5 mole percent based on the starting diacid or diester used to generate the polyester resin.

In embodiments, an amount of the sulfonated polyester resin is in a range from about 0.05 percent by weight of nanodendrite precursor solution to about 50.0 percent by weight of nanodendrite precursor solution, or about 0.1 to about 40.0 percent by weight of nanodendrite precursor solution, or about 0.3 to about 25.0 percent by weight of nanodendrite precursor solution.

In embodiments, the silver nanoparticles that serve as the building blocks for the silver nanodendrites may comprise solely elemental silver or may be a silver composite, including composites with other metals. Such metal-silver composite may include either or both of (i) one or more other metals and (ii) one or more non-metals. Suitable other metals include for example Al, Au, Pt, Pd, Cu, Co, Cr, In, and Ni, particularly the transition metals for example Au, Pt, Pd, Cu, Cr, Ni, and mixtures thereof. Exemplary metal composites are Au—Ag, Ag—Cu, Au—Ag—Cu, and Au—Ag—Pd. Suitable non-metals in the metal composite include for example Si, C, and Ge. The various components of the silver composite may be present in an amount ranging for example from about 0.01% to about 99.9% by weight, particularly from about 10% to about 90% by weight. In embodiments, the silver composite is a metal alloy composed of silver and one, two or more other metals, with silver comprising for example at least about 20% of the nanoparticles by weight, particularly greater than about 50% of the nanoparticles by weight. Unless otherwise noted, the weight percentages recited herein for the components of the silver-containing nanoparticles do not include any stabilizer.

Silver nanoparticles composed of a silver composite can be made for example by using a mixture of (i) a silver compound (or compounds, especially silver (I) ion-containing compounds) and (ii) another metal salt (or salts) or another non-metal (or non-metals) during the reduction step.

Those skilled in the art will appreciate that metals other than silver may be useful and can be prepared in accordance with the methods disclosed herein. Thus, for example, composites may be prepared with nanoparticles of copper, gold, palladium, or composites of such exemplary metals.

In embodiments, the silver nanodendrites accessible by the methods herein may be used in conjunction with complex nanostructured materials that also include, without limitation, carbon nanotubes (CNTs, including single-walled, double-walled, and multi-walled), graphene sheet, nanoribbons, nano-onions, hollow nanoshell metals, nanowires and the like. In embodiments, CNTs may be added in amounts that enhance electrical and thermal conductivity.

In embodiments, the methods herein are conducted in the absence of a surfactant.

In embodiments, there are provided methods comprising heating a branched sulfonated polyester resin in de-ionized water, adding a solution of silver (I) ion to the heated resin in water to form a mixture, wherein silver (I) ion is present in a non-zero amount less than about 1 percent by weight of the mixture, reducing silver (I) to silver (0) by heating the mixture from about 65° C. to about 90° C., thereby forming an emulsion of composite particles comprising a sulfonated polyester matrix and a plurality of silver nanoparticles disposed within the sulfonated polyester matrix, and allowing the silver nanoparticles to agglomerate into a silver nanodendrite structure by leaving the emulsion to sit at ambient temperature for at least one week.

In embodiments, the ratio of silver (I) ion to branched sulfonated polyester resin is about 1:1 or about 1:50 or about 1:120, including any ratio or range of ratios in between.

In embodiments, the silver nanodendrite forms after about three weeks. In embodiments, silver nanodendrites form in about one to three weeks, or about one to two weeks, or in about two weeks to about four weeks.

In embodiments, such methods are carried in the absence of a surfactant.

In embodiments, such methods are carried in the absence of an external reducing agent, i.e., conventional type reducing agents such as citrate, ascorbate, hydride reagents, and the like. In embodiments, a reducing agent may nonetheless be employed in the methods herein. Such reducing agents may be selected from ascorbic acid, trisodium citrate, glucose, galactose, maltose, lactose, gallic acid, rosmaric acid, caffeic acid, tannic acid, dihydrocaffeic acid, quercetin, sodium borohydride, potassium borohydride, hydrazine hydrate, sodium hypophosphite, hydroxylamine hydrochloride. In embodiments, reducing agents for the synthesis of AgNPs may include sodium borohydride or sodium citrate. Selection of appropriate reducing agent may provide access to desirable nanoparticle morphologies. For example, ascorbic acid was observed to provide silver nanoplate forms during a study directed to quantitation of vitamin C tablets. Rashid et al. *J. Pharm. Sci.* 12(1):29-33 (2013).

In embodiments, there are provided silver nanodendrites formed in the presence of a branched sulfonated polyester resin. The methods disclosed herein provide access to highly fibrous nanodendrite structures. Without being bound by theory, it is postulated that the highly fibrous structures, difficult to access in scalable quantities by methods in the art, are made accessible via the sulfonated polyester (SPE) component. Morphology-controlled synthesis remains a substantial challenge in the art, especially for platinum-based structures. Most methods require surfactants or multistep processes which are complicated and expensive; moreover, in such methods contamination becomes an issue due to impurities taken up during the multi-step process. Kaniyankandy et al. Nanotechnology 18:125610 (2007); Lei et al. Journal of Materials Science 1-7 (2010). The SPEs used in the methods disclosed herein provide a high surface area and the sulfonate moieties may provide an anchor for silver ion aiding nucleation. In some embodiments, the size of a nanodendrite may exceed well over 1 micron as a structured network, without limitations on aspect ratio; see FIG. 5 for an example of an accessible scale of size of nanodendrites. Other physical properties controlled by the methods herein include porosity, improved mechanical strength, as observed in the exemplary Ag-BSPE nanoparticles, and increased density. The micrographs associated with the Examples below indicate the scale and size of nanodendrites (such as FIG. 5). The Tg/Mw/Mn for Examples 3 and 4 below with 100 times excess BSPE provided almost twice as high molecular weight compared to control which is believed to be due to a networking effect/crosslinking between silver and BSPE matrix. The Tg does not improve upon addition of silver to BSPE. Indeed, the Tg actually decreases for same solids amount of BSPE with 0.28% silver nitrate when compared to control as indicated in Table A below.

TABLE A

| Example | Reducing Agent | % BSPE (w/w) | % AgNO$_3$ (w/w) | % BSPE/ %AgNO$_3$ | Mw | Mn | Tg (onset) |
|---|---|---|---|---|---|---|---|
| 2 (vial 5) | none | 0.32 | 0.32 | 1.0 | n/a | n/a | n/a |
| 3 | trisodium citrate dihydrate | 15.11 | 0.15 | 100.77 | 8021 | 2903 | 54.94 |
| 4 | none | 28.45 | 0.28 | 101.60 | 3605 | 1518 | 49.53 |
| control | none | 29.46 | none | | 4226 | 1759 | 55.09 |

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 25° C.

EXAMPLES

Example 1

This example describes the preparation of an exemplary branched sulfonated amorphous polyesters (BSPE-1).

A branched amorphous sulfonated polyester resin comprised of 0.425 mole equivalent of terephthalate, 0.080 mole equivalent of sodium 5-sulfoisophthalic acid, 0.4501 mole equivalent of 1,2-propanediol, and 0.050 mole equivalent of diethylene glycol, was prepared as follows. In a one-liter Parr reactor equipped with a heated bottom drain valve, high viscosity double turbine agitator, and distillation receiver with a cold water condenser was charged 388 grams of dimethylterephthalate, 104.6 grams of sodium 5-sulfoisophthalic acid, 322.6 grams of 1,2-propanediol (1 mole excess of glycols), 48.98 grams of diethylene glycol, (1 mole excess of glycols), trimethylolpropane (5 grams) and 0.8 grams of butyltin hydroxide oxide as the catalyst. The reactor was heated to 165° C. with stirring for three hours and then again heated to 190° C. over a one hour period, after which the pressure was slowly reduced from atmospheric pressure to about 260 Torr over a one hour period, and then reduced to 5 Torr over a two hour period. The pressure was then further reduced to about 1 Torr over a 30 minute period and the polymer was discharged through the bottom drain onto a container cooled with dry ice to yield 460 grams of sulfonated-polyester resin. The branched sulfonated-polyester resin had a glass transition temperature measured to be 54.5° C. (onset) and a softening point of 154° C.

Example 2

This example describes the preparation of a stock solution of the exemplary polymer prepared in Example 1, and conditions for reducing silver in its presence.

A stock solution of BSPE-1 in water was made by adding 0.5 g BSPE-1 to 125 mL distilled water. The stock solution had a [BSPE-1]=0.004 g/mL. Five 10 mL glass vials were rinsed three times with distilled water, three times with acetone and allowed to air dry. Various volumes of water and stock BSPE solutions were added to the vials as outlined in Table 1 below. The vials were equipped with a magnetic stir bar and capped with aluminum foil. The vials were heated to 90° C. and stirred at 950 rpm. After 1 hour, 1.884 mL of 0.1 M AgNO$_3$ solution was added to each vial with a micropipette. The solutions were mixed for 22 hours at 90° C. at 950 rpm. The reduction of silver was apparent by the color change to yellow/brown. The samples were allowed to sit at room temperature with exposure to light for 2 weeks without mixing.

TABLE 1

| Sample vial (10 mL total volume) | Volume stock 0.004 g/mL BPSE (mL) | [BPSE] (g/mL) | AgNO$_3$ (g) | Volume 0.1M AgNO$_3$ (mL) | [AgNO$_3$] (M) | Volume deionized water (mL) |
|---|---|---|---|---|---|---|
| 1 | 0 | 0 | 0.032 | 1.884 | 0.019 | 8.116 |
| 2 | 2 | 0.008 | 0.032 | 1.884 | 0.019 | 6.116 |
| 3 | 4 | 0.016 | 0.032 | 1.884 | 0.019 | 4.116 |
| 4 | 6 | 0.024 | 0.032 | 1.884 | 0.019 | 2.116 |
| 5 | 8 | 0.032 | 0.032 | 1.884 | 0.019 | 0.116 |

Figure 5:
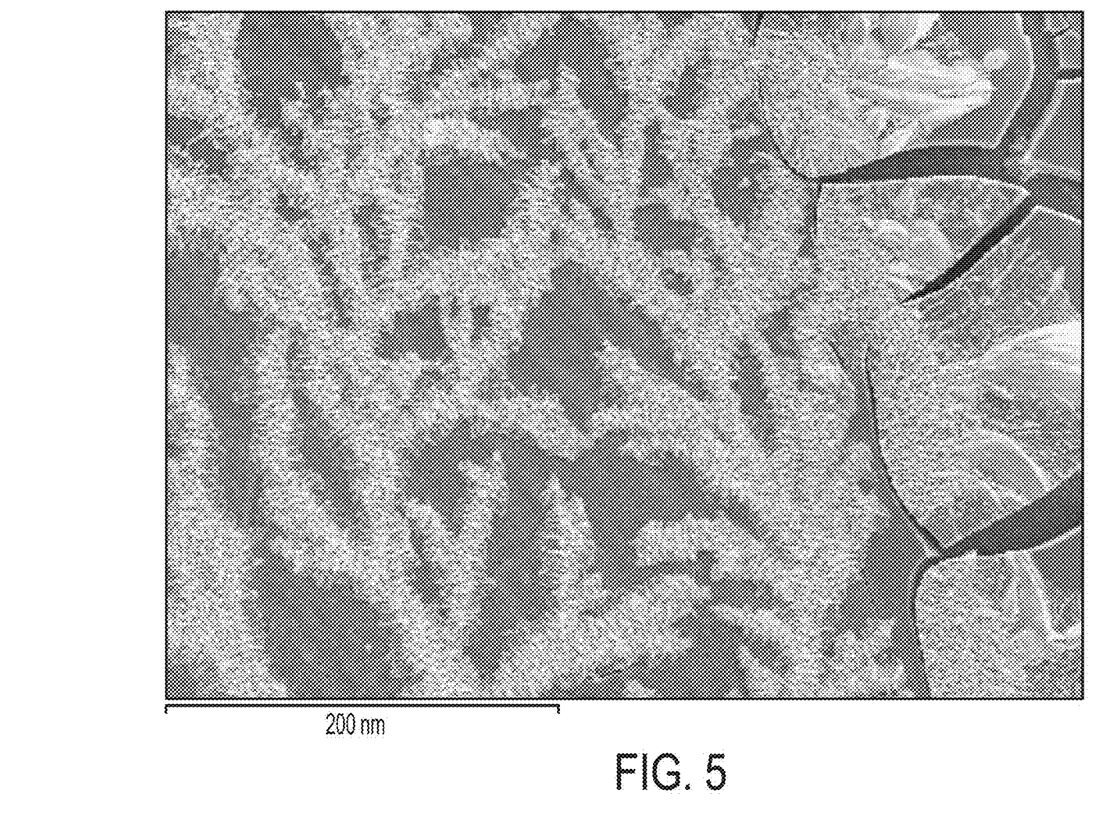
FIG. 5 shows a SEM image of a silver nanodendrite structure, Example 2, Vial 5. [BSPE-1]=0.032 g/mL; [AgNO$_3$]=0.019M.

As shown in FIG. 5, the sample vial (5) with the highest concentration of BSPE, showed very highly structured silver nanodendrites that look fibrous in nature. No reducing agent was used in this example. The SEM clearly shows the dendrite structures with multilevel generations, having a number of long main trunks with shorter thick side branches shooting off to the sides and some of these thick branches having shorter branches or leaves attached to them.

Figure 6:
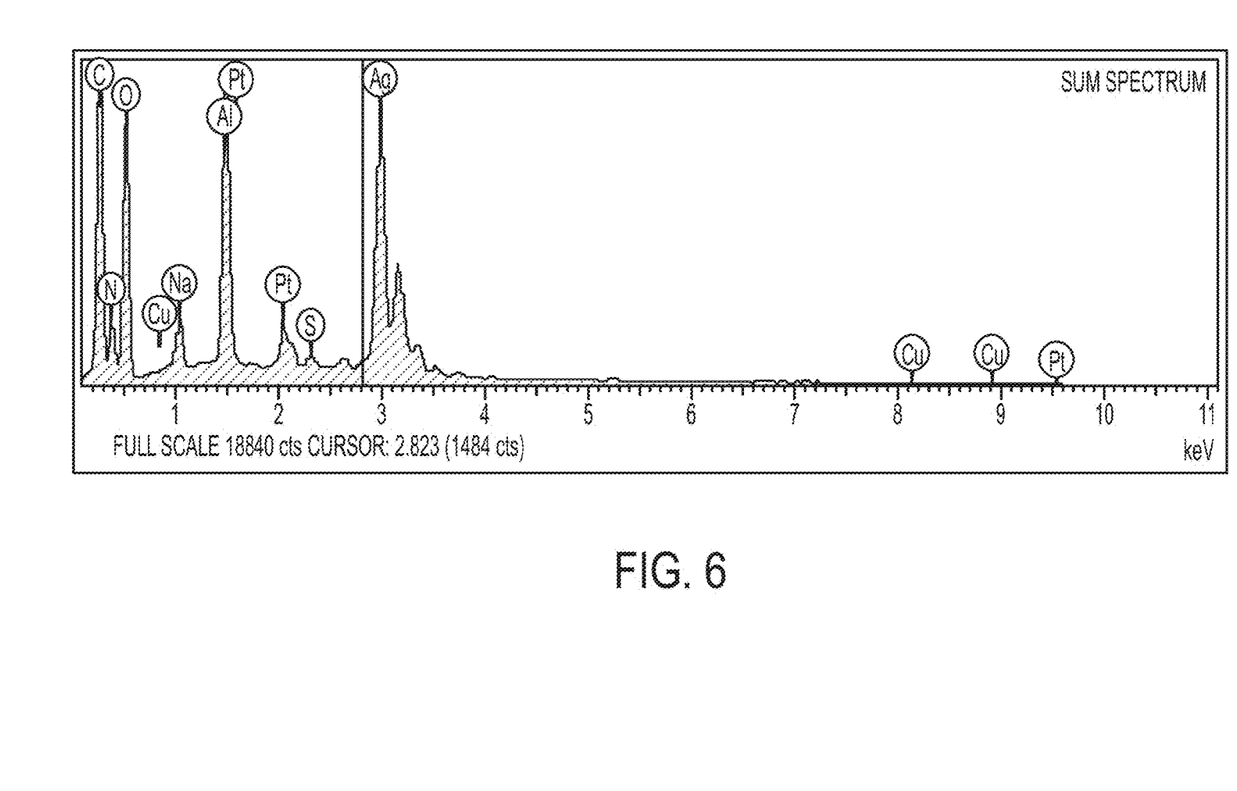
FIG. 6 shows Energy Dispersive X-ray Spectroscopy or EDS spectrum which indicates the elemental distribution in a sample surface at a depth of about 1 to 2 microns. The aluminum peak is from the background film that the sample was plated on; the platinum peak is from the coating of the sample during SEM analysis.
Figure 7A:
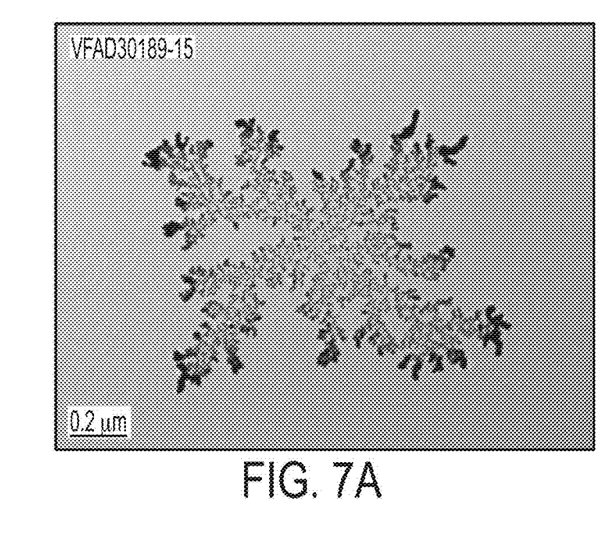
FIGS. 7A-D show a series of transmission electron microscope (TEM) images of Example 3 where the dark areas represent dense regions of silver dendrite structure.
Figure 7B:
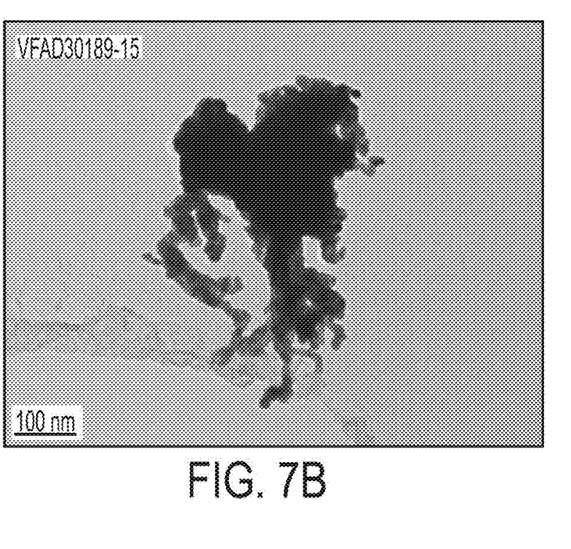
Figure 7C:
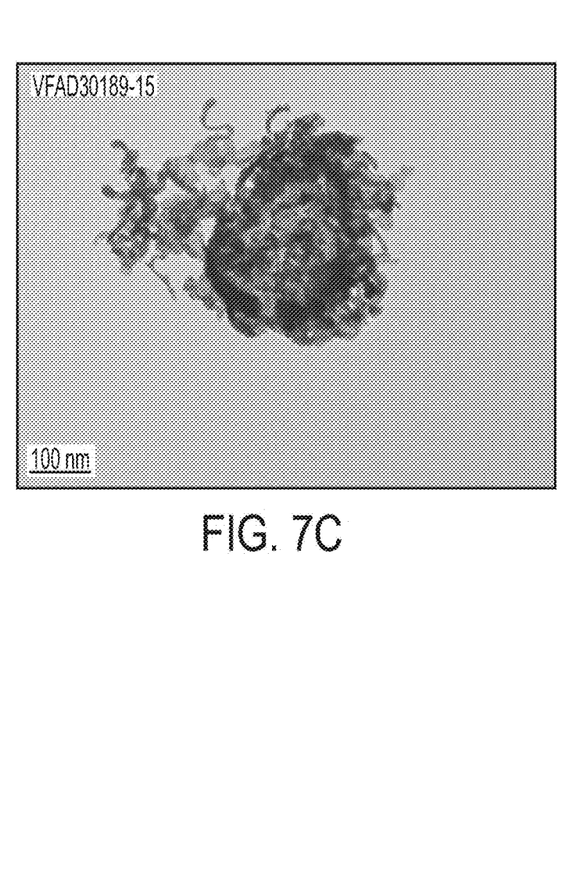
Figure 7D:
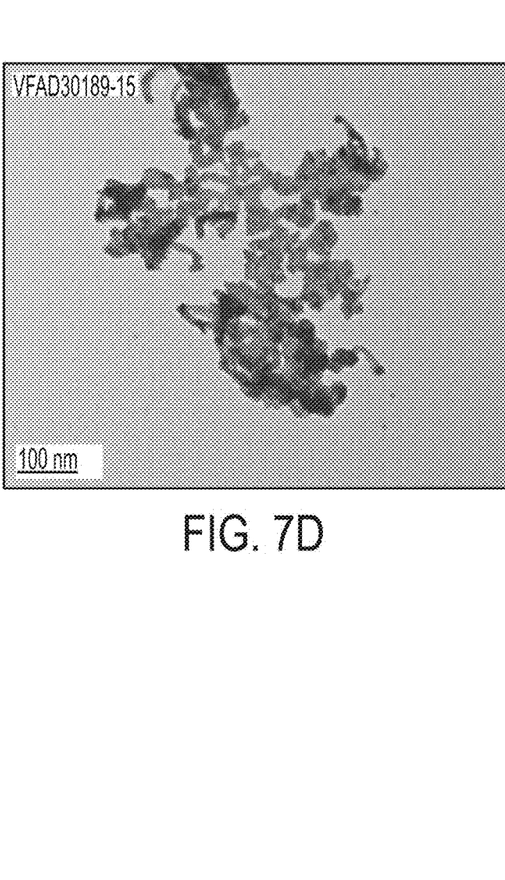

Energy Dispersive X-ray Spectroscopy or EDS was used to determine the elemental composition of the BSPE/Ag nanodendrite material. FIG. 6 shows the presence of five peaks located between 3 keV and 4 keV of the spectrum. Those maxima are directly related to the silver characteristic lines K and L X-ray emission lines which clearly confirms the presence of silver in the organic/inorganic nanodendrite composition. The maxima located at 0.2 keV and 0.5 keV come from carbon and oxygen respectively which confirms the presence of BSPE.

Example 3

This Example shows the preparation of nanoparticulate silver in the presence of 1% (w/w) trisodium citrate solution as reducing agent.

The reaction was carried out in a 3 necked, 500 mL round bottom flask equipped with an overhead stirrer, reflux condenser, thermocouple, hot plate, and nitrogen entrance (the condenser acted as the nitrogen exit). 100 mL of DIW was charged into the flask at room temperature (22° C.). The heat was turned on set to 90° C. and nitrogen was run through the system (RPM=300). Once the temperature had stabilized, 25.00 g of solid BSPE-1 was added to the system in a finely ground state (RPM=300). 6 mL of DIW was used to wash down BSPE from the sides of the flask. The solution became hazy and had a blue tinge. After 1.5 hrs, 0.25 g AgNO$_3$ dissolved in 4 mL DIW was added dropwise to the solution at a rate of approx. 1 drop/second (RPM=300). The solution became slightly darker (brownish). After 25 minutes, 15 mL of 1% (w/w) trisodium citrate solution (reducing agent) was added to the system dropwise at a rate of 1 drop/second. Upon complete addition, the solution was stirred at 90° C. for 2 hours (RPM=300). The solution was allowed to cool to room temperature (RPM=300). The final appearance was an opaque, brown solution.

Example 4

Figure 4:
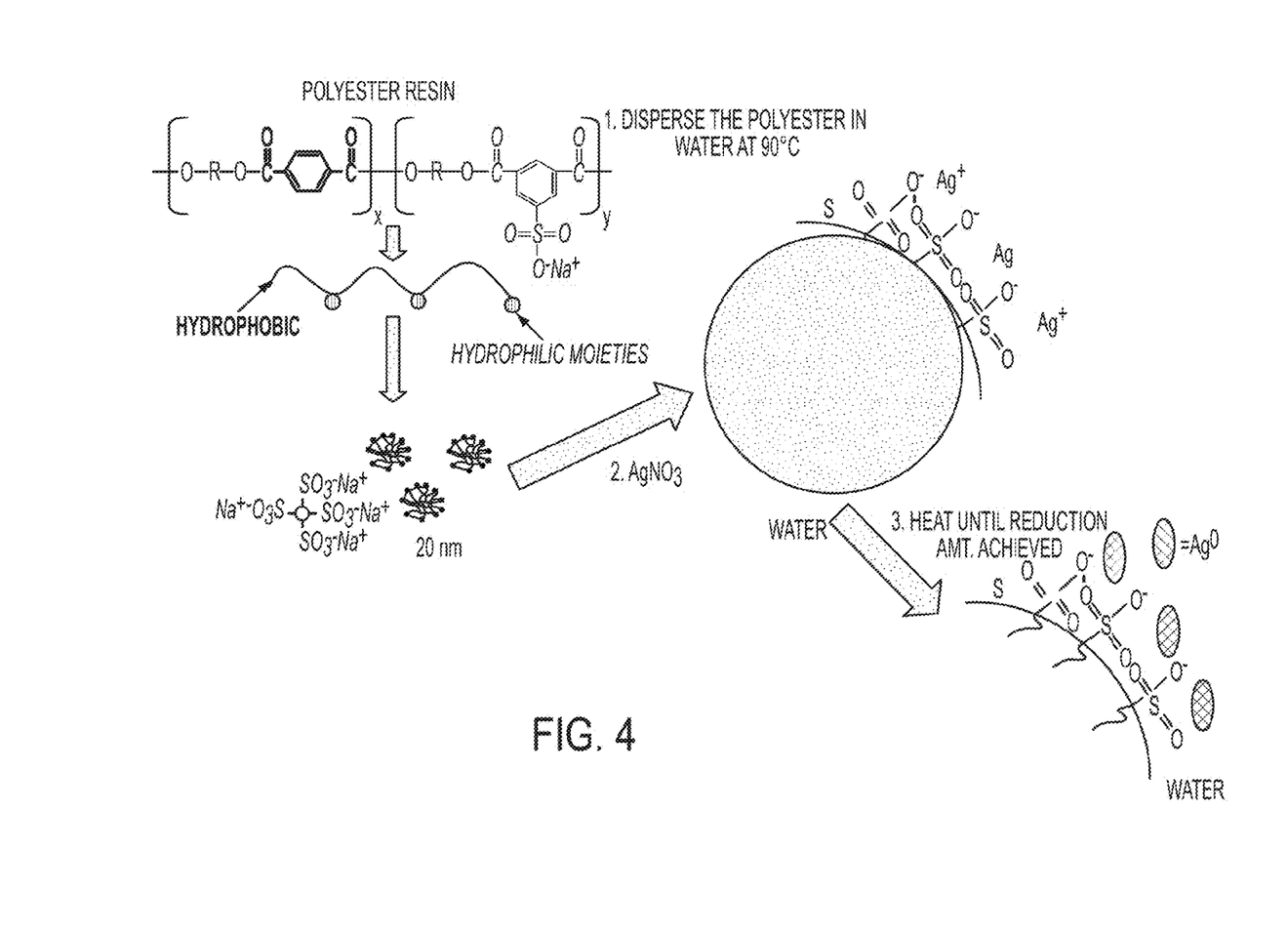
FIG. 4 shows an illustration of a potential mechanism of sulfonated polyester self-assembly in the presence of silver ion in the absence of a reducing agent (Step (b) of FIG. 3).

This Example shows the preparation nanoparticulate silver in the absence of a reducing agent—for possible mechanism see FIG. 4.

The reaction was carried out in a 3 necked, 250 mL round bottom flask equipped with an overhead stirrer, reflux condenser, thermocouple, hot plate, and nitrogen entrance (the condenser acted as the nitrogen exit). 98.75 mL of DIW was charged into the flask at room temperature (22° C.). The heat was turned on set to 90° C. and nitrogen was run through the system for 20 minutes (RPM=250). Once the temperature had stabilized, 50.00 g of solid BSPE-1 was added to the system in a finely ground state (RPM=340). The solution became hazy and had a blue tinge. After 1.5 hrs, 0.5000 g $AgNO_3$ dissolved in 3 mL DIW was added dropwise to the solution at a rate of approx. 1 drop/second (RPM=340). The solution became brown as drops were added. After 30 minutes, a small sample was taken and called Example 4.

TABLE 2

| Example | Loading of $Ag^+$ (M) | Reducing agent | Theoretical solids (%) | $AgNO_3$ loading (M) | $AgNO_3$ loading (w/w %) | Actual solids (%) | Particle size $D_{50}$ (nm) | Zeta Pot. (mV) |
|---|---|---|---|---|---|---|---|---|
| 3 | 1.05E−02 | trisodium citrate | 16.89 | 0.0105 | 0.15 | 16.35 | 33.9 | −56.9 |
| 4 | 2.35E−02 | none | 28.88 | 0.0232 | 0.28 | 25.47 | 51.7 | −58.7 |

Figure 8:
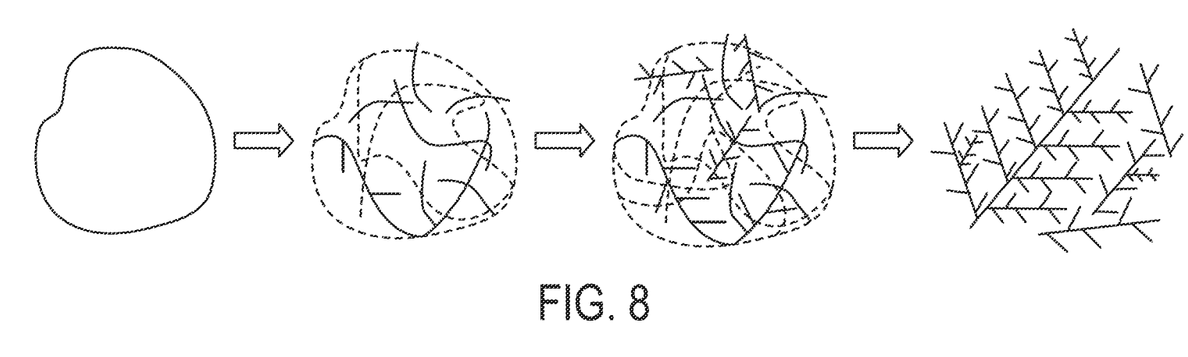
FIG. 8 shows a schematic illustration of a model for the formation and morphology evolution of silver dendrite structures.

The SEM images shown in FIG. 7A-D indicate that diffusion-limited aggregation (DLA) is likely operable. They show a series of transmission electron microscope (TEM) images of Example 3 where the dark areas represent dense regions of silver dendrite structure. FIG. 8 shows a schematic illustration of a model for the formation and morphology evolution of silver dendrite structures. The formation of silver dendrites occurs under these non-equilibrium conditions which may be due to locally oriented attachment of silver nanoparticles. These Examples demonstrate that the morphology, size and structure of silver nanodendrites can be controlled by tuning the concentrations of polymer matrix and the silver metal salt precursor.

Table 3 shows the comparison of BSPE and silver nitrate loadings for the three different dendritic materials prepared in Examples 2 to 4.

TABLE 3

| Example | Reducing Agent | % BSPE (w/w) | % $AgNO_3$ (w/w) | % BSPE/ % $AgNO_3$ |
|---|---|---|---|---|
| 2 (vial 5) | none | 0.32 | 0.32 | 1.0 |
| 3 | trisodium citrate dehydrate | 15.11 | 0.15 | 100.77 |
| 4 | none | 28.45 | 0.28 | 101.60 |

The morphology of Example 2 is the most fibrous and intricate out of the three examples shown in Table 3. It also has the same loading of BSPE relative to $AgNO_3$. Example 2 has a very low loading of BSPE compared to the other examples yet has the highest amount of $AgNO_3$. Example 3 shows structures of less intricacy, while Example 4, having the highest amount of BSPE, is only starting to show the formation of separate nanocrystals after 3 months. The ratio of BSPE:Ag seems to have a big impact on the morphology, size and structure. A higher proportion of BSPE in the system tends to hinder or extremely slow down the gradual aggregation of small silver particles that are to eventually form Ag dendrites.

Figure 9A:
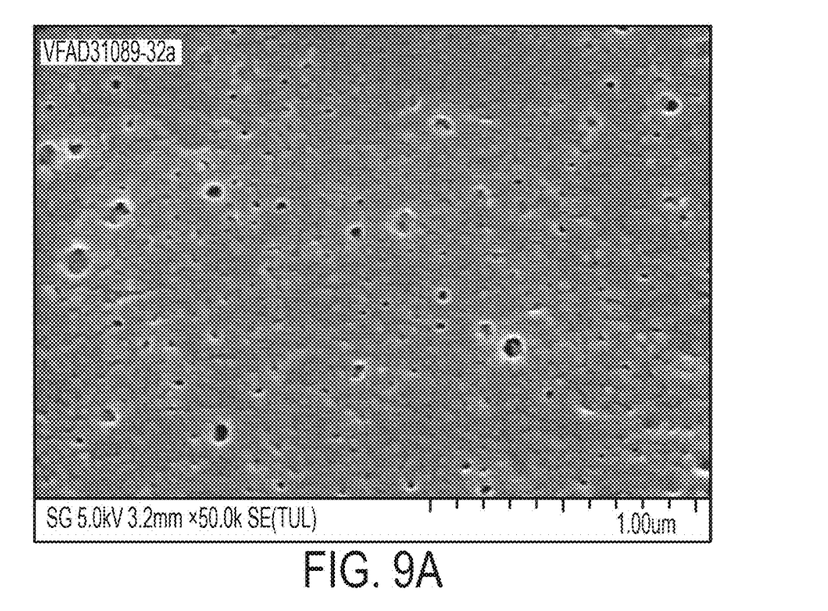
Figure 9B:
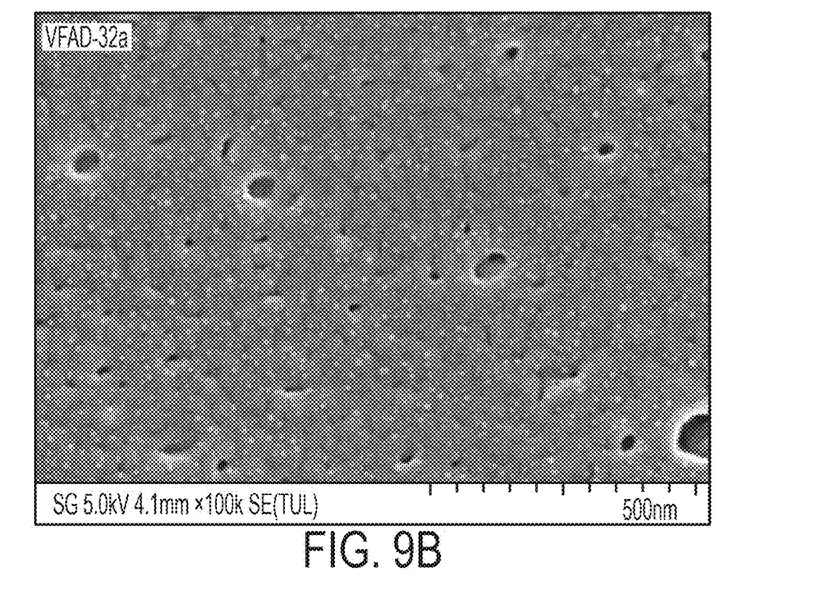

FIG. 9 shows the SEM of a BSPE/Ag nanoparticle at time zero and then again at time 3.5 months. A typical color change was seen upon reacting BSPE and $AgNO_3$ together, indicating that silver nanoparticles were being formed. We hypothesize that the BSPE matrix stabilized the Ag nanoparticles to the point of almost freezing them in place. After looking at the same slide after 3 months, the formation of silver nanoparticles is well-defined and some particles show evidence of starting to come together in the form of nanocrystals.

What is claimed is:

1. A method comprising:
    heating a sulfonated polyester resin in an organic-free solvent;
    adding a solution of silver (I) ion to the heated resin in water to form a mixture;
    reducing silver (I) to silver(0) by heating the mixture from about 65° C. to about 90° C., thereby forming an emulsion of composite particles comprising a sulfonated polyester matrix and a plurality of silver nanoparticles disposed within the sulfonated polyester matrix; and
    allowing the silver nanoparticles to agglomerate into a silver nanodendrite structure.

2. The method of claim 1, wherein heating the sulfonated polyester resin is conducted at a temperature from about 65° C. to about 90° C.

3. The method of claim 1, wherein the organic-free solvent is de-ionized water.

4. The method of claim 1, wherein allowing the silver nanoparticles to agglomerate comprises leaving the emulsion to sit unstirred at ambient temperature for at least about one week.

5. The method of claim 1, wherein a source of silver (I) ion is selected from silver nitrate, silver sulfonate, silver fluoride, silver perchlorate, silver lactate, silver tetrafluoroborate, silver oxide and silver acetate.

6. The method of claim 1, wherein a concentration of silver ion after addition is a non-zero amount up to about 1 percent by weight of the solution or less.

7. The method of claim 1, wherein reducing silver (I) to silver(0) further comprises adding ascorbic acid or trisodium citrate as a reducing agent.

8. The method of claim 1, wherein the sulfonated polyester resin is a branched polymer.

9. The method of claim 1, wherein the sulfonated polyester matrix is a lithium, potassium, or sodium salt of a polymer selected from the group consisting of poly(1,2-propylene-5-sulfoisophthalate), poly(neopentylene-5-sulfoisophthalate), poly(diethylene-5-sulfoisophthalate), copoly-(1,2-propylene-5-sulfoisophthalate)-copoly-(1,2-propylene-terphthalate), copoly-(1,2-propylenediethylene-5-sulfoisophthalate)-copoly-(1,2-propylene-diethylene-terephthalatephthalate), copoly(ethylene-neopentylene-5-sulfoisophthalate)-copoly-(ethylene-neopentylene-terephthalatephthalate), and copoly(propoxylated bisphenol A)-copoly-(propoxylated bisphenol A-5-sulfoisophthalate).

10. The method of claim 1, wherein the sulfonated polyester resin comprises a polyol monomer unit selected from the group consisting of trimethylolpropane, 1,2-propanediol, diethylene glycol, and combinations thereof.

11. The method of claim 1, wherein the sulfonated polyester resin comprises a diacid monomer unit selected from the group consisting of terephthalic acid, sulfonated isophthalic acid, and combinations thereof.

12. The method of claim 1, wherein an amount of the sulfonated polyester resin is in a range from about 0.05 percent by weight of the mixture to about 50 percent by weight of the mixture.

13. The method of claim 1, wherein the method is conducted in the absence of a surfactant.

14. A method comprising:
heating a branched sulfonated polyester resin in de-ionized water;
adding a solution of silver (I) ion to the heated resin in water to form a mixture, wherein silver (I) ion is present in a non-zero amount up to about 1 percent by weight of the mixture;
reducing silver (I) to silver(0) by heating the mixture from about 65° C. to about 90° C., thereby forming an emulsion of composite particles comprising a sulfonated polyester matrix and a plurality of silver nanoparticles disposed within the sulfonated polyester matrix; and
allowing the silver nanoparticles to agglomerate into a silver nanodendrite structure by leaving the emulsion to sit at ambient temperature for at least one week.

15. The method of claim 14, wherein the ratio of the concentration of silver (I) ion to branched sulfonated polyester resin is in a range from about 1:1 to about 1:120.

16. The methods of claim 14, wherein the silver nanodendrite forms after about three weeks.

17. The method of claim 14, wherein the method is carried out in the absence of a surfactant.

* * * * *